Jan. 28, 1969    H. J. DEMERS    3,423,899
CONCEALED HANGING SYSTEM
Filed Oct. 18, 1966

INVENTOR.
HARLAN J. DEMERS
BY John P. Taylor
his Attorney

United States Patent Office 3,423,899
Patented Jan. 28, 1969

3,423,899
CONCEALED HANGING SYSTEM
Harlan J. Demers, Menominee, Mich., assignor to Koppers Company, Inc., a corporation of Delaware
Filed Oct. 18, 1966, Ser. No. 587,614
U.S. Cl. 52—721     9 Claims
Int. Cl. E04c 3/12

ABSTRACT OF THE DISCLOSURE

A laminated wood beam concealably hung from a support by mounting a bracket into the end of the wood beam which has been manufactured with a concealed longitudinal groove therein. A transverse bore positioned to correspond to the desired final length of the beam is drilled through the beam to intersect the groove. The beam is then sawn at this point and the bracket mounted into the bore and groove enabling the beam to be fitted flush to a support member from which it is hung by an upper portion of the bracket which rests on the support member.

---

This invention relates to the concealed support of a wooden beam. More particularly, the invention provides a method and structure whereby a wooden beam may be cut to a desired length in the field and a concealed hanger bracket mounted thereon without excessive fitting and trimming of the beam.

The invention allows a manufacturer to produce a laminated wooden beam of a length most convenient for manufacturing purposes which may then be cut to the desired length in the field by a worker. A concealed hanger bracket may be installed in the cut end of the beam without special tools. The method does not require any special skill on the part of the operator.

In accordance with the invention a laminated beam is provided comprising an elongated first beam member having a groove of desired height and width extending lengthwise thereof and a second elongated beam member which is laminated to the cut surface of the first beam member to provide a laminated beam which longitudinally conceals the groove. The laminated beam has a vertical bore drilled therein which intersects the groove in the first beam member. The positioning of the vertical bore corresponds to the desired final length of the beam. After drilling the bore, the beam is then cut at the bore to provide an end surface. The side of the bore is now exposed at this end surface enabling a concealable hanger bracket to be mounted therein by insertion of the concealable hanger bracket, which has portions thereon conforming to the shape of the bore and the groove, in the bore and the groove adjacent the end surface of the laminated beam.

The invention will be further understood by referring to the drawings in which.

Figure 1:
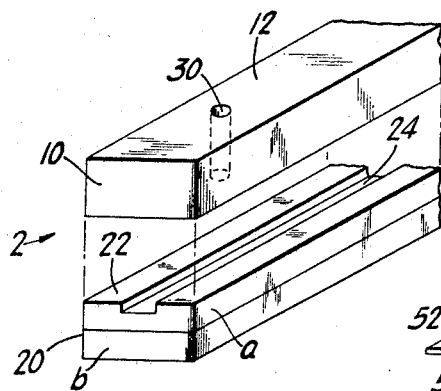
FIGURE 1 is an exploded view of the laminated beam showing the lengthwise routing therein.
Figure 2:
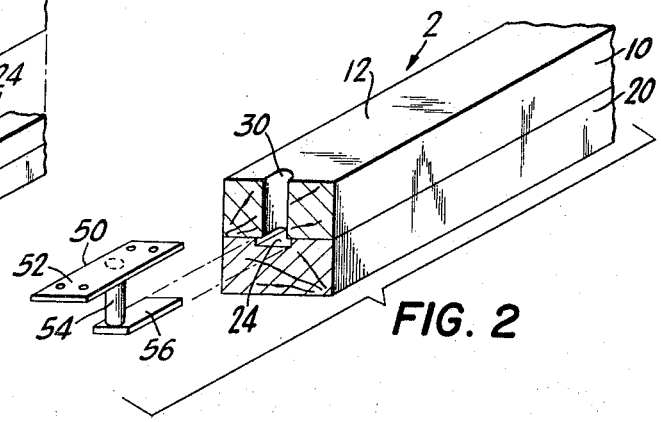
FIGURE 2 is a perspective view of the cut laminated beam and concealed bracket just prior to insertion of the bracket into the beam.

Referring now to FIGURE 1, a wooden laminated beam generally indicated 2 is shown comprising an upper beam member 10 and a lower beam member 20. Beam members 10 and 20 may be unitary or they may each comprise a series of laminated beams. Lower beam member 20, as illustrated, comprises a lamination of two beams *a* and *b*. Upper face 22 of beam member 20 has a groove 24 routed the entire length of the beam. While the routing need not necessarily extend the entire length of the beam, it must extend a considerable distance to allow maximum utilization of the advantages of the invention as will be more fully described below.

After groove 24 has been routed into face 22, beam 10 is laminated on face 22 to beam 20 thus hiding groove 24 except at the end of the beam. This completes the operations by the manufacturer of the laminated beam. Thus, the manufacturer may produce laminated wooden beams of a length most convenient to his production facilities; yet the beam is easily cut in the field to the desired length. Thus, none of the beauty of any open wooden laminated beam construction is sacrificed in that the hanger may still be installed in the field to provide a concealed hanging system every bit as ornamental and beautiful as if the manufacturer had installed the brackets in the factory.

When beam 2 is to be installed in the field, the actual desired length is measured and a vertical bore 30 is drilled into laminated beam 2. Bore 30 must extend completely through beam 10 so as to communicate with groove 24. It need not be drilled deeper. However, inadvertent drilling into beam 20 will not be harmful unless the drill passes completely through beam 20. After drilling bore 30, the beam is sawed to the desired length. A hanger 50 is then installed into the newly sawed end of laminated beam 2.

Figure 3:
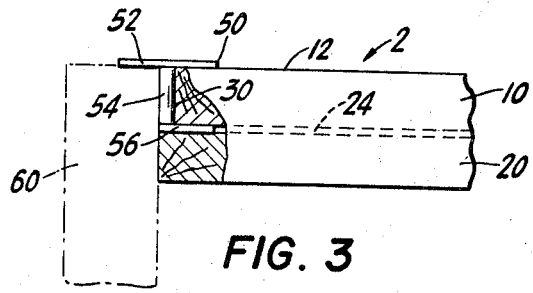
FIGURE 3 is a partially cut away side angle view of the beam supported in an installed position by the concealed hanger bracket.

Hanger bracket 50 has a top plate 52 which, as best seen in FIGURE 3, is mounted to the top surface 12 of laminated beam 2 and to the top surface of the supporting member 60 indicated in phantom lines in FIGURE 3. A depending portion 54 of hanger bracket 50 extends downwardly from top plate 52 and supports a bottom plate 56. Bottom plate 56 has a width and thickness which generally conforms to the dimenions of groove 24. Bottom plate 56 may be of any convenient length. The length of depending portion 54 is dependent upon the thickness of beam 10 because upper plate 52 and lower plate 56 must snugly fit to the upper and lower surfaces of upper beam 10 as shown in FIGURE 3.

Hanger bracket 50 is constructed of steel, although aluminum or similar materials could be used depending upon the strength required.

Figure 4:
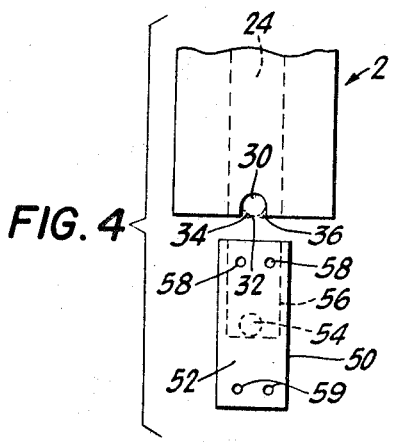
FIGURE 4 is a top view of the preferred embodiment of the beam and bracket.

The cross-sectional configuration of depending portion 54 is somewhat dependent on both the desired strength of the bracket and the position of bore 30. In the preferred embodiment shown in FIGURE 4, depending portion 54 is circular. Therefore, bore 30 is drilled so that an outer edge 32 of bore 30 corresponds to the desired eventual length of beam 2. The beam is then sawed on a line tangent to edge 32. In this embodiment portions 34 and 36 must then be chipped out before hanger bracket 50 is inserted.

Hanger bracket 50 is retained in beam 2 during installation of the beam in its final location by suitable fastening means, such as screws, lag bolts or the like, passing through holes 58 in top plate 52 into the beam. After beam 2 has been lifted into position on support 60 in FIGURE 3 by a crane or the like, fastening means, such as previously discussed, are placed through holes 59 to secure bracket 50 through top plate 52 to support 60.

Figure 5:
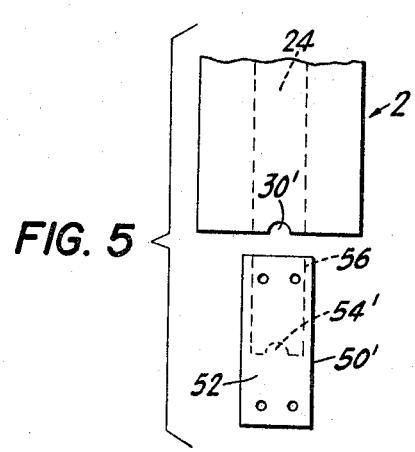
FIGURE 5 is a top view of an alternate embodiment of the beam and bracket.

FIGURE 5 illustrates an alternate construction wherein hanger bracket 50′ has a depending portion 54′ which is semi-circular. Semi-circular portion 54′ may be used when lighter weight beams are used which do not have a weight sufficient to necessitate use of the circular shaped portion 54. When using bracket 50', bore 30' is positioned so that its center represents the eventual desired length of the beam. The saw cut then bisects bore 30' leaving a semi-circular configuration which mates with depending portion 54' without further removal of material.

The invention thus provides a concealed construction whereby a prefabricated laminated beam may be cut to proper length on the construction site and a concealed hanger installed in the beam without the time-consuming steps of chiseling and boring out recesses in the end of the beam. This results in reduction of both material and labor costs to install such a construction yet provides an eye-appealing aesthetical appearance.

I claim:
1. An open wooden laminated beam assembly wherein a laminated beam is hung from a support member by a concealed bracket which is generally hidden from view from positions beneath said beam comprising a laminated sawable wood beam formed by laminating together: a first elongated beam member having a groove of desired height and width extending lengthwise thereof; and a second beam member laminated to the grooved surface of the first beam to provide a laminated unitary beam which longitudinally conceals the groove; said laminated beam having a vertical generally circular bore drilled therein to intersect said groove in said first beam, the positioning of said bore corresponding to the desired final lenth of said beam; an end surface on said laminated beam formed by cutting said beam at the bore to expose the side of the bore; and a concealable hanger, having an upper generally horizontal support plate at least a portion of which rests on said support member, a generally vertical portion depending from said plate and fitted into said bore, and a generally horizontal plate attached at one end to said depending portion and fitted into said groove thereby hiding both said depending portion and said bottom plate from view when the end of said laminated beam is fitted flush against said support member.

2. The laminated beam of claim 1 wherein said first and second beam members each comprise a series of laminated beams.

3. The laminated beam of claim 1 wherein said end surface, formed by cutting the beam, is tangential to the outer edge of the bore.

4. The laminated beam of claim 1 wherein said end surface, formed by cutting the beam, bisects the bore.

5. The laminated beam of claim 1 wherein said concealable hanger bracket has a generally circular depending portion whereby said depending portion may be fitted into the bore from the end surface cut at a tangent to the outer edge of the bore.

6. The laminated beam of claim 1 wherein said concealable hanger bracket has a generally semi-circular depending portion whereby said depending portion may be fitted into the bore from the end surface cut to bisect the bore.

7. The laminated beam of claim 1 wherein said beam members are wooden and said concealable hanger bracket is constructed of a metal having sufficient strength to support the weight of the wood.

8. The laminated beam of claim 1 wherein said groove is generally rectangular in cross-section and correspondingly said concealable hanger bracket has a lower plate thereon of generally rectangular cross-section which may be inserted into said rectangular groove.

9. The laminated beam of claim 1 wherein said groove is generally rectangular in cross-section and said concealable hanger bracket comprises a top plate adapted to rest both on the top of the beam and on a supporting member and having a generally circular depending portion attached thereto at a point spaced from the ends of said top plate, said depending portion having a lower plate attached thereto of rectangular cross-section, said depending portion and lower plate being insertable respectively in said bore and said rectangular groove, the length of said depending portion between said upper plate and said lower plate corresponding to the length of said bore enabling said top plate to rest on the top of said beam when said lower plate is inserted in said rectangular groove.

References Cited

UNITED STATES PATENTS

| 163,996 | 6/1875 | Hardy | 52—721 |
| 233,696 | 10/1880 | Raisor | 187—20.94 |

JAMES T. McCALL, *Primary Examiner.*

A. CALVERT, *Assistant Examiner.*

U.S. Cl. X.R.

287—20.94